(12) United States Patent
Christensen

(10) Patent No.: US 11,281,077 B2
(45) Date of Patent: Mar. 22, 2022

(54) DOUBLE COLUMN STAND

(71) Applicant: Bo Christensen, Nordborg (DK)

(72) Inventor: Bo Christensen, Nordborg (DK)

(73) Assignee: SAVAGE Universal Corp, Nordberg (DK)

(*) Notice: Subject to any disclaimer, the term of this patent is extended or adjusted under 35 U.S.C. 154(b) by 260 days.

(21) Appl. No.: 16/873,243

(22) Filed: Mar. 3, 2020

(65) Prior Publication Data

US 2021/0278752 A1 Sep. 9, 2021

(51) Int. Cl.
| | | |
|---|---|---|
| *G03B 17/56* | (2021.01) |
| *F16M 11/42* | (2006.01) |
| *F16M 11/38* | (2006.01) |
| *F16M 11/26* | (2006.01) |
| *G03B 15/06* | (2021.01) |

(52) U.S. Cl.
CPC .......... *G03B 17/561* (2013.01); *F16M 11/38* (2013.01); *F16M 11/42* (2013.01); *F16M 11/26* (2013.01); *G03B 15/06* (2013.01)

(58) Field of Classification Search
USPC ...................... 396/5, 419; 248/585
See application file for complete search history.

(56) References Cited

U.S. PATENT DOCUMENTS 8,033,229 B1 * 10/2011 McCanna .............. G03B 21/54
108/145

* cited by examiner

*Primary Examiner* — Clayton E. LaBalle
*Assistant Examiner* — Warren K Fenwick
(74) *Attorney, Agent, or Firm* — Mark Ogram

(57) ABSTRACT

The invention provides a stand using two legs which are selectively elongated. Ideally, each leg has two spaced apart wheels allowing the stand to be readily moved. The legs are connected by a scissor member which allows the assembly to be collapsed for storage and easy movement. A receiver for a paper roll is attachable to the top of both legs. A roller, from which paper from the paper roll extends. The legs are manually extended either by hand or in concert using a winch assembly connected to both legs.

19 Claims, 13 Drawing Sheets

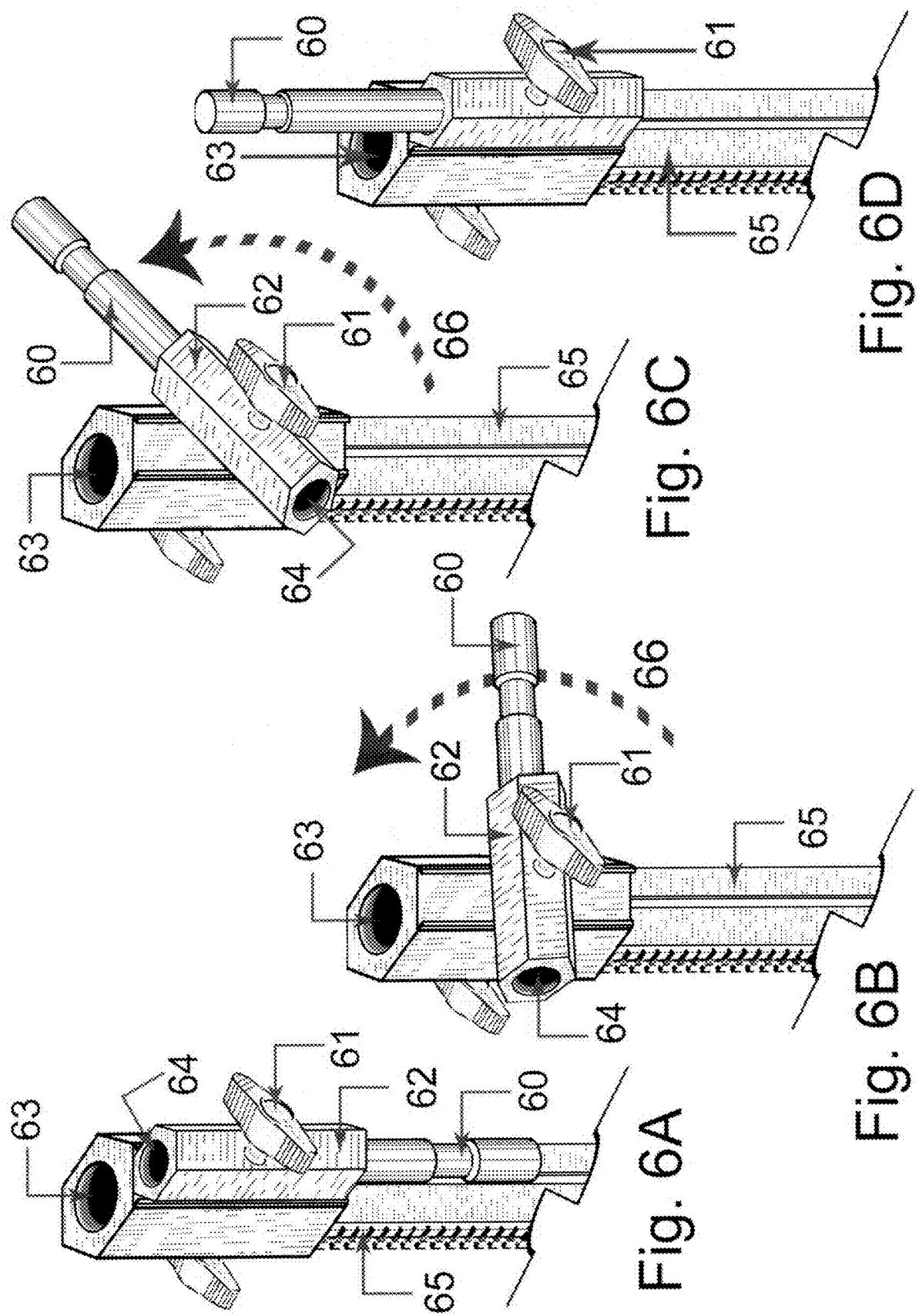

DOUBLE COLUMN STAND

PRIORITY

Priority for this application is claimed from U.S. Provisional Application Ser. No. 62/919,680 filed on Mar. 22, 2019 entitled "Double Column Stand", and U.S. Provisional Application Ser. No. 62/919,676, filed on Mar. 22, 2019, and entitled "Double Column Background Stand".

BACKGROUND OF THE INVENTION

While the discussion herein relates to photography equipment, the invention is not intended to be limited to this field but has applications in other fields and uses as those of ordinary skill art readily recognize Stands, as used in the photographic industry, are generally single pole stands which may be used in unison with other single pole stands to form a backdrop or to hold different instruments. As single pole stands, they are not amenable to movement and require disassembly for movement and then reassembly at the new location. This is required even if minor movement is required.

If the two independent stands are used for a backdrop, placement of the roll of paper or other material requires the use of a stepladder and two people. Besides the safety concern due the step ladder, the weight of the roll of paper being manually raised makes assembly difficult.

Once the paper roll is installed, the pole stands require two people to pull them apart to "tension" the paper prior to photographic use.

A variety of solutions have been attempted such as those described in U.S. Pat. No. 10,194,546, issued Jan. 29, 2019, to Hori and entitled "Display Device and Stand"; U.S. Pat. No. 10,066,783, issued Sep. 4, 2018, to Shen et al. and entitled Support Assembly for Vertically Disposed Objects such as Televisions and Video Monitors"; and U.S. Pat. No. 9,769,942, issued Sep. 19, 2017, to Longo and entitled "Retractable Display Assembly"; all of which are incorporated hereinto by reference.

It is clear there is a need for a versatile stand.

SUMMARY OF THE INVENTION

The invention provides a stand using two legs which are selectively elongated. In the preferred embodiment, each leg has two spaced apart wheels as support which allows the stand to be readily moved. At their base, the legs are connected by a scissor member which allows the assembly to be collapsed for storage and easy movement.

A receiver for a paper roll is attachable to the top of both legs. In one embodiment, a roller, under which paper from the paper roll extends, is secured at the bottom of both legs.

In dispensing paper from the roll, the legs are manually extended either by hand or in concert using a winch assembly connected to both legs. When the legs are "raised", the paper is dispensed. This arrangement allows the paper roll to be installed when the legs are in a "lowered" state, thereby improving safety. There isn't a need to use stepladders to change or adjust seamless rolls.

The winch utilizes a self-locking mechanism so that the concentric brake locks and releases depending on which way the winch is turned (whereas traditionally there are ratchets or brake mechanisms).

When the receiver is removed from the legs, mounting brackets at the top of the legs accept individual items such as lights, screens, etc. Further, the legs can work in tandem to mount a boom or rack for holding multiple lights thereon.

In this context, the mounting bracket of the preferred embodiment is a receptacle located at the top of the leg which accepts a pin of a first diameter To increase the versatility of the mounting brackets, a swivel mechanism allows both a receptacle having a different diameter as well as pin to be used through easy rotation of the swivel mechanism. In some embodiments, the pin on the swivel mechanism is eliminated and a different diameter receptacle (hole) is used.

For some applications, a boom is secured to both legs simultaneously to extend over/near the subject without requiring the stand to intrude into the subject's space.

The double column stand of this invention is easily maneuverable while fully assembled/loaded whereas two single stands would be unstable and unsafe during movement and would require a disassembly and reassembly before use at a repositioned site.

Further, the stand of this invention folds up more compact than two single stands by themselves with the legs unfolding like a traditional stand. The scissor cross brace, in the preferred embodiment, can be unfolded from one side by simply sliding down the bracket which is loosely secured to the legs (no need for two people to pull them apart).

An assembled setup of lights and light modifiers is easily be repositioned in the same configuration if the photographic subject has to be moved. This provides fast repositioning of lights and modifiers.

Another attribute of the invention is that it provides an ideal "frame" to hang cloth for backgrounds, used as a blocking wall or a light filter. The castors on the stand allows it to be moved in and out of position easily. In this manner, the stand of this invention provides a multi-purpose studio accessory. Bounce boards or reflectors are securely positioned and rolled around without added labor.

A noted earlier, the stand can function as a boom holder, keeping the center of gravity closer to the ground (whereas traditionally counterweights have to be hung on boom end).

In some applications, to the receiver is secured a camera slider allowing the stand to securely hold a camera. The two columns are also functional as bases for a work station for computers, focus pullers, multi screens, etc.

The invention, together with various embodiments thereof, will be more fully explained by the accompanying drawings and the following description thereof.

DRAWINGS IN BRIEF

FIGS. 6A, 6B, 6C, and 6D illustrate the preferred secondary swivel mount.

FIGS. 7A, 7B, 7C, 7D, and 7E illustrate different uses for the invention.

Figure 8A:
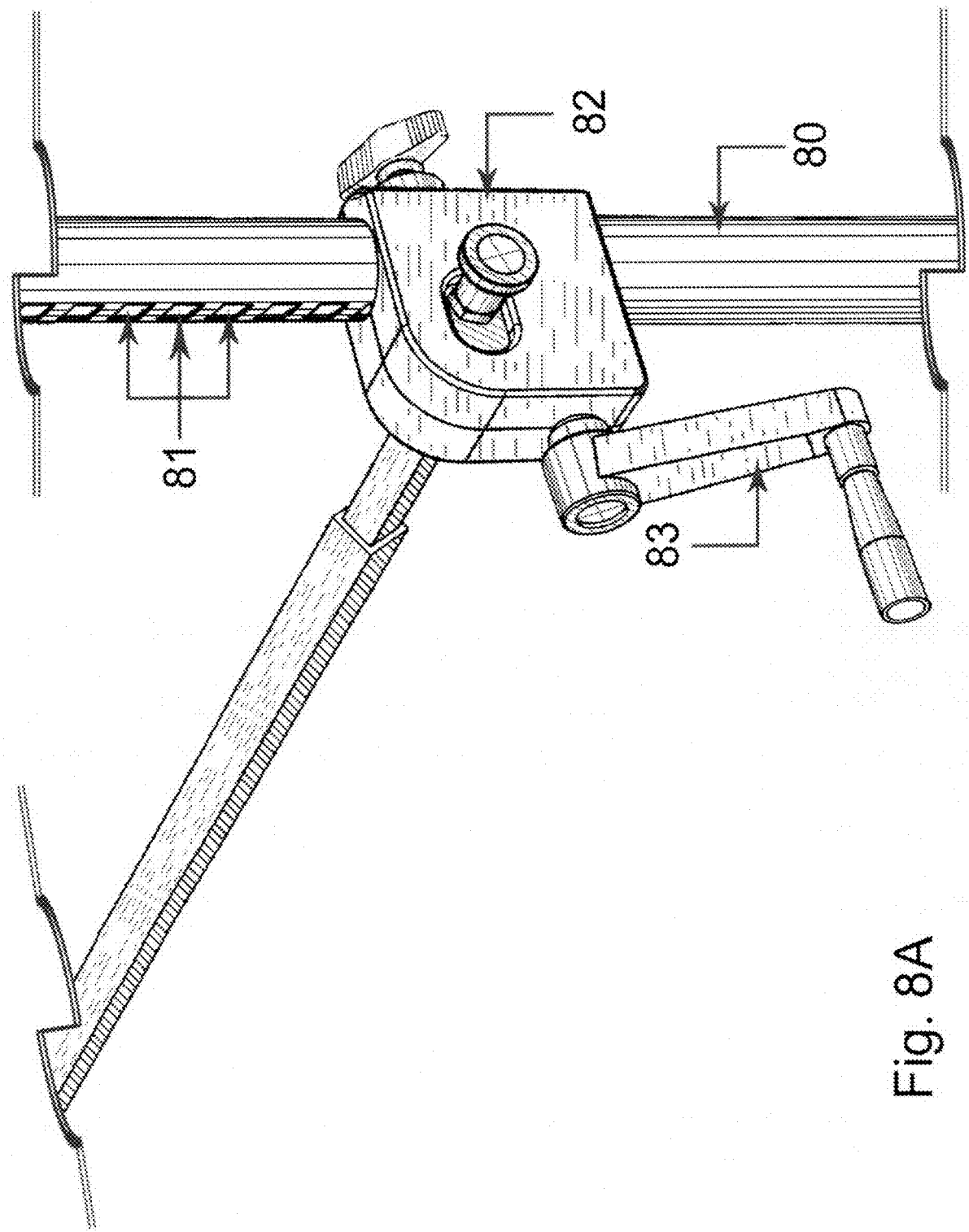
Figure 8B:
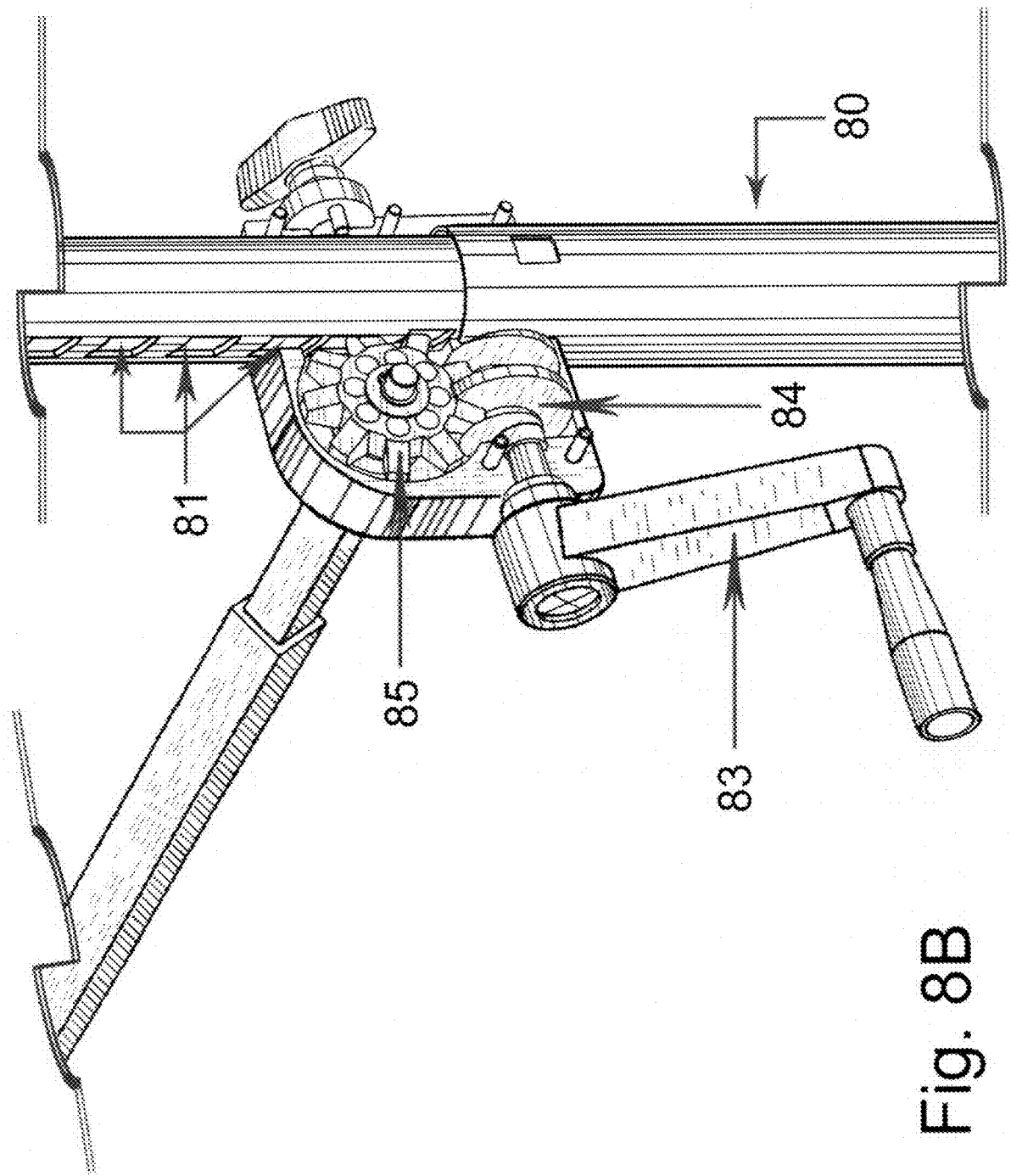

FIGS. 8A and 8B illustrate another embodiment of the winch.

DRAWINGS IN DETAIL

Figure 1A:
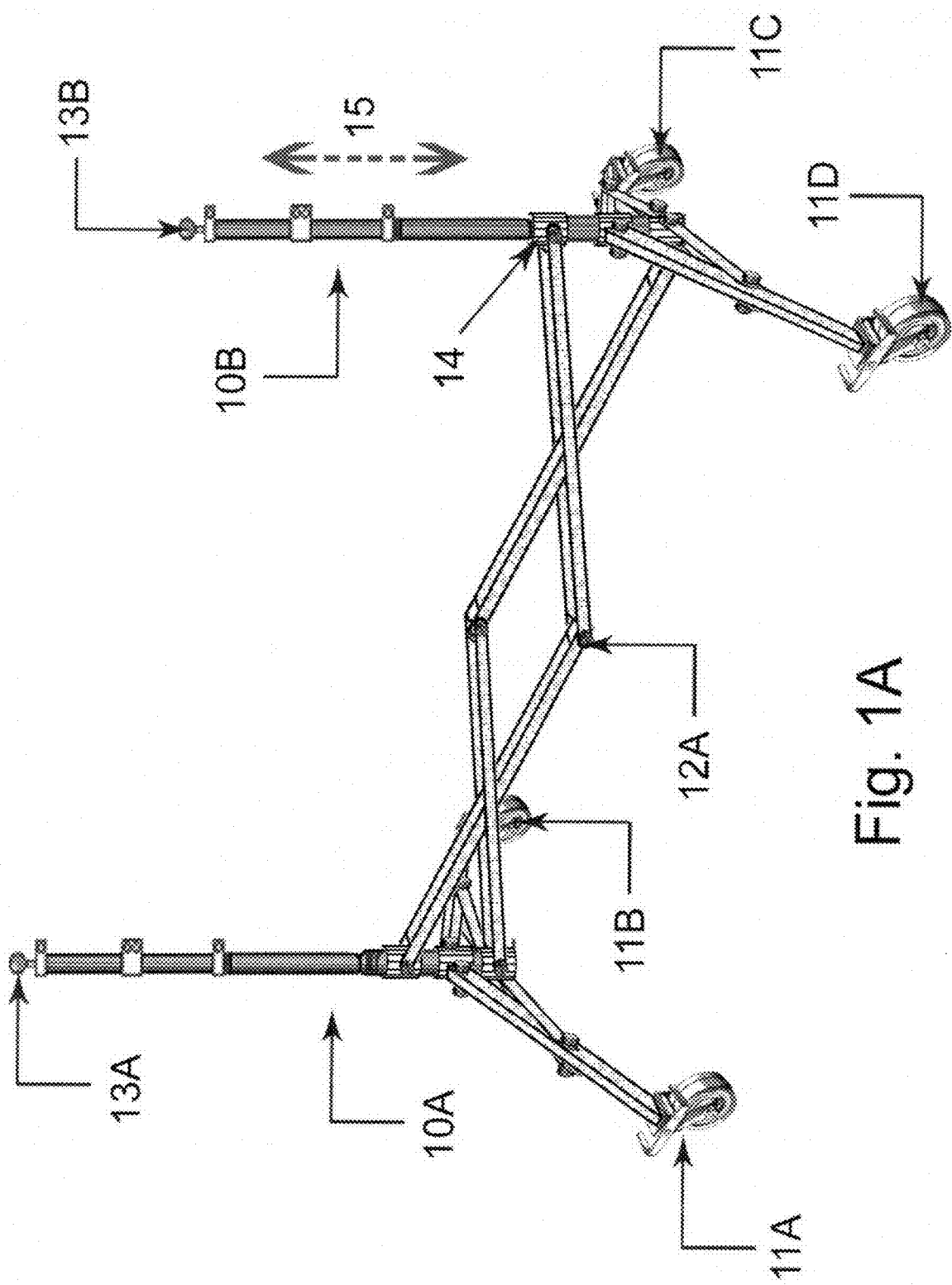
FIGS. 1A and 1B illustrate two different embodiments of the invention highlighting the scissor connector.
Figure 1B:
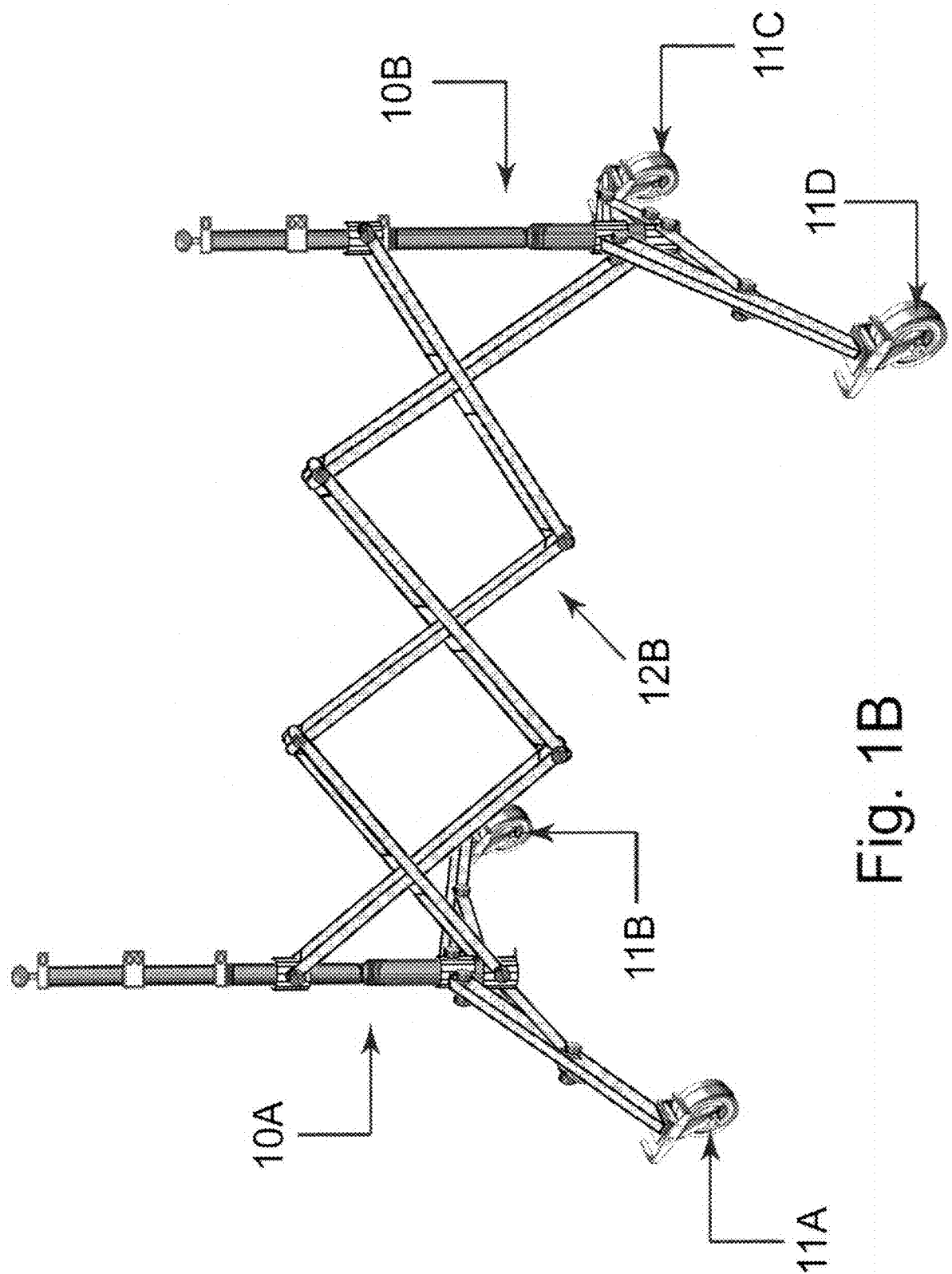

FIGS. 1A and 1B illustrate two different embodiments of the invention highlighting the scissor connector.

The invention provides for a stand having two legs 10A and 10B. Each leg has two spaced apart wheels. Leg 10A has wheels 11A and 11B supporting it; leg 10B has wheels 11C and 11D for its support. Receivers 13A and 13B are affixed atop leg 10A and 10B respectively. Receivers 13A and 13B are used to affix apparatus to the legs 10A and 10B.

Note, legs 10A and 10B are extendable.

A scissor member 12A and 12B is secured between the legs 10A. In one embodiment, mechanism 14 slides over leg 10B allowing movement (arrow 15) of mechanism to extend/retract scissor 12A.

Figure 1C:
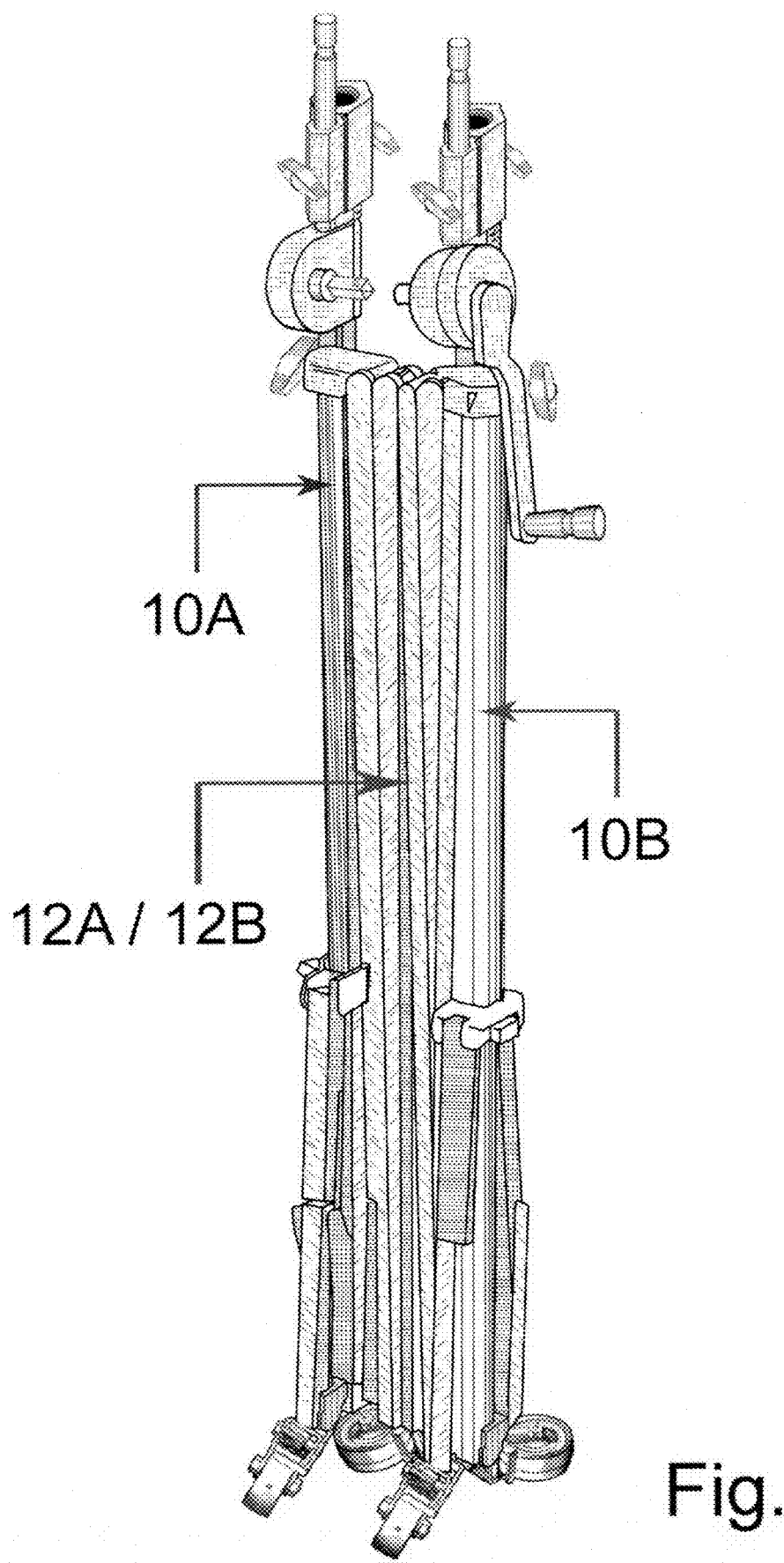
FIG. 1C illustrates the collapsed state of the embodiments of FIGS. 1A and 1B.

FIG. 1C illustrates the collapsed state of the embodiments of FIGS. 1A and 1B.

The embodiments of FIGS. 1A and 1B fold up as illustrated with the scissor member 12A or 12B between legs 10A and 10B. This provides a more compact storage unit than the prior art.

Figure 2:
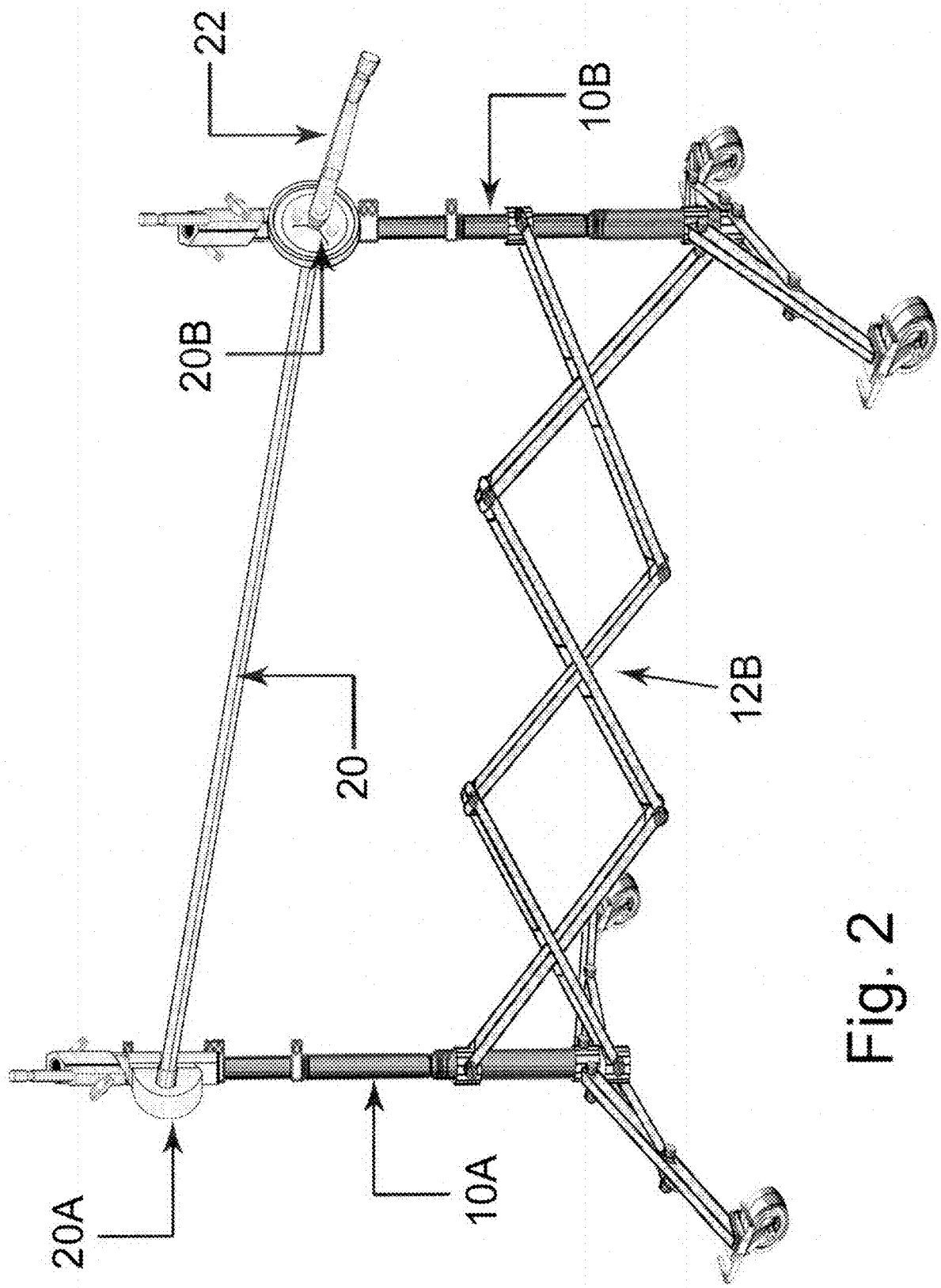
FIG. 2 illustrates an embodiment of the invention which employs the use of a winch to raise and lower the legs of the invention.

FIG. 2 illustrates an embodiment of the invention which employs the use of a winch to raise and lower the legs of the invention.

The stand of this figure is identical to the stand of FIG. 1B except that winch members 20A and 20B have been added. Winch 20A is connected to winch 20B via shaft 20, thereby allowing the two members to work in concert. As a user operates handle 22 of winch 20B, shaft 20 turns to operate winch 20A.

Operation of the winch members 20A and 20B cause the legs 10A and 10B to be elongated. Those of ordinary skill in the art readily recognize a variety of winch mechanisms which may be used in this context to raise or lower the legs.

Figure 3A:
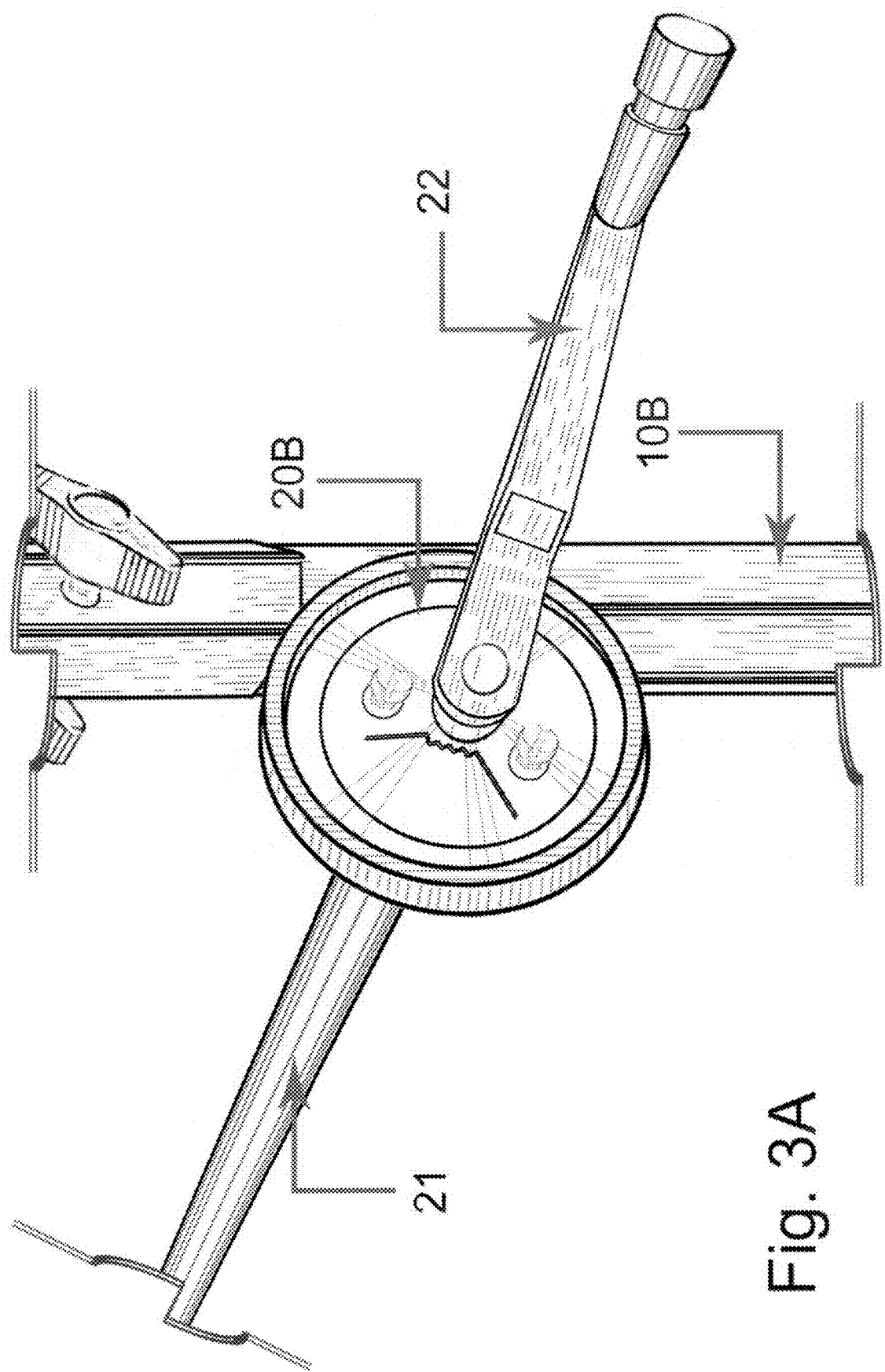
FIGS. 3A and 3B illustrate the winch mechanism.
Figure 3B:
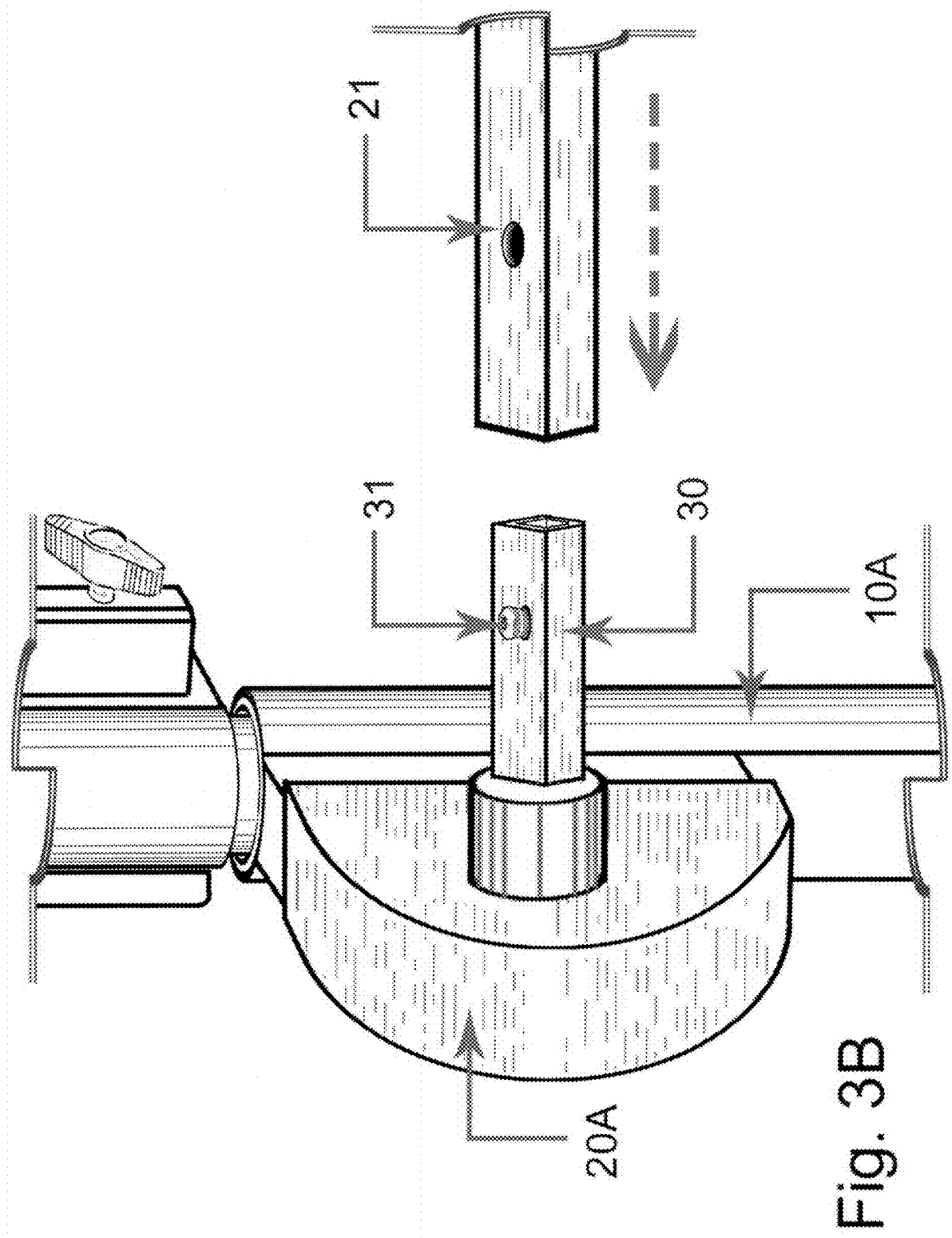

FIGS. 3A and 3B illustrate the winch mechanism.

The winch 20B and 20A are ideally self-locking winch mechanisms. This is a concentric brake/lock that self-engages and releases depending on which way handle 22 is turned. This permits one-handed operation of the assembly.

Winch 20B is mounted onto leg 10B and is used to extend leg 10 as handle 22 is turned (rotating in the opposite direction retracts leg 10B). Shaft 21 extends to winch 20A and the connector 30. Spring ball plunger 31 is used to easily connect shaft 21 to connector 30. As winch 20B is turned, shaft 21 assures that winch 20A also turns to raise leg 10A.

Figure 4A:
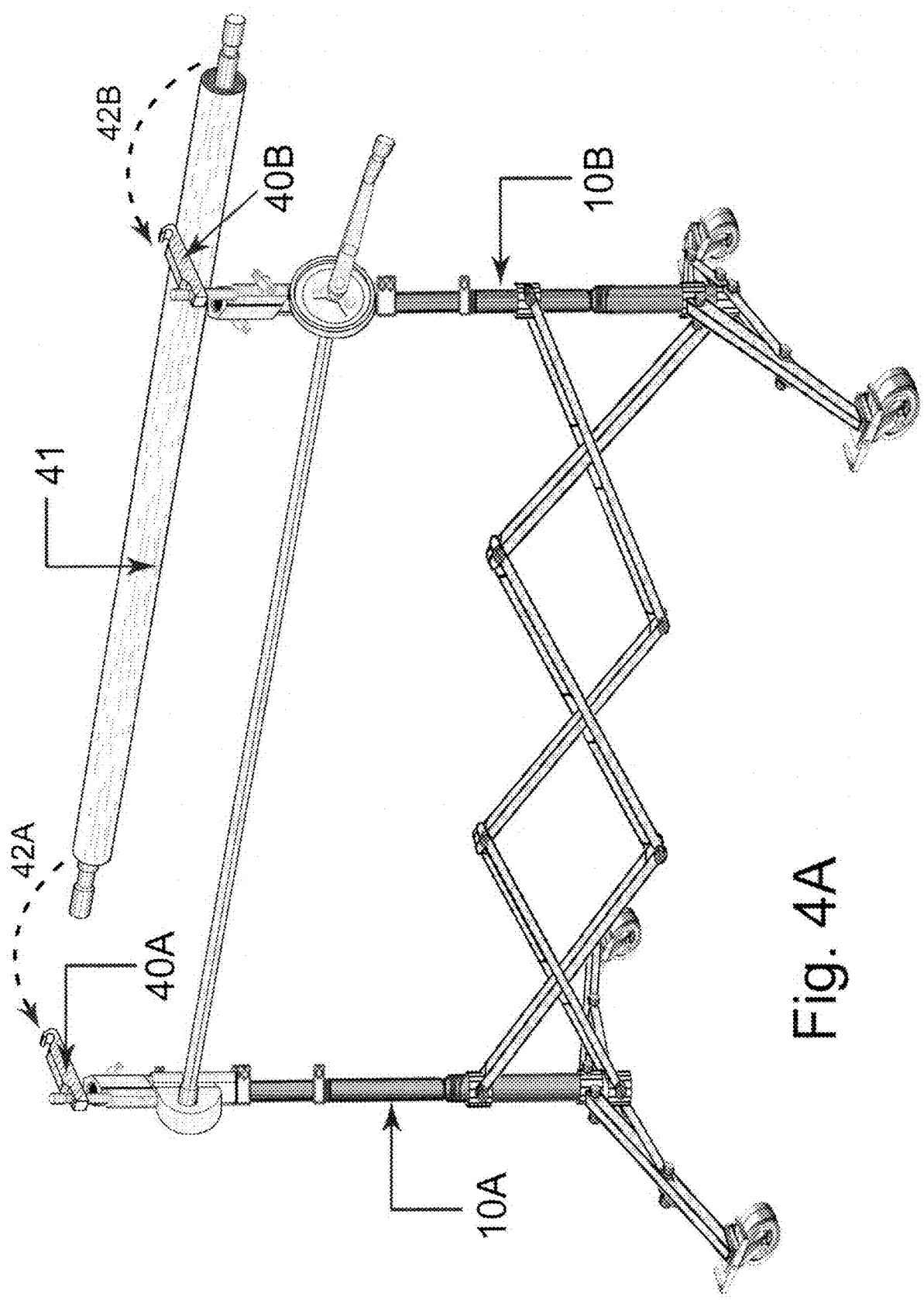
FIGS. 4A and 4B illustrate the use of a paper roll and its deployment.
Figure 4B:
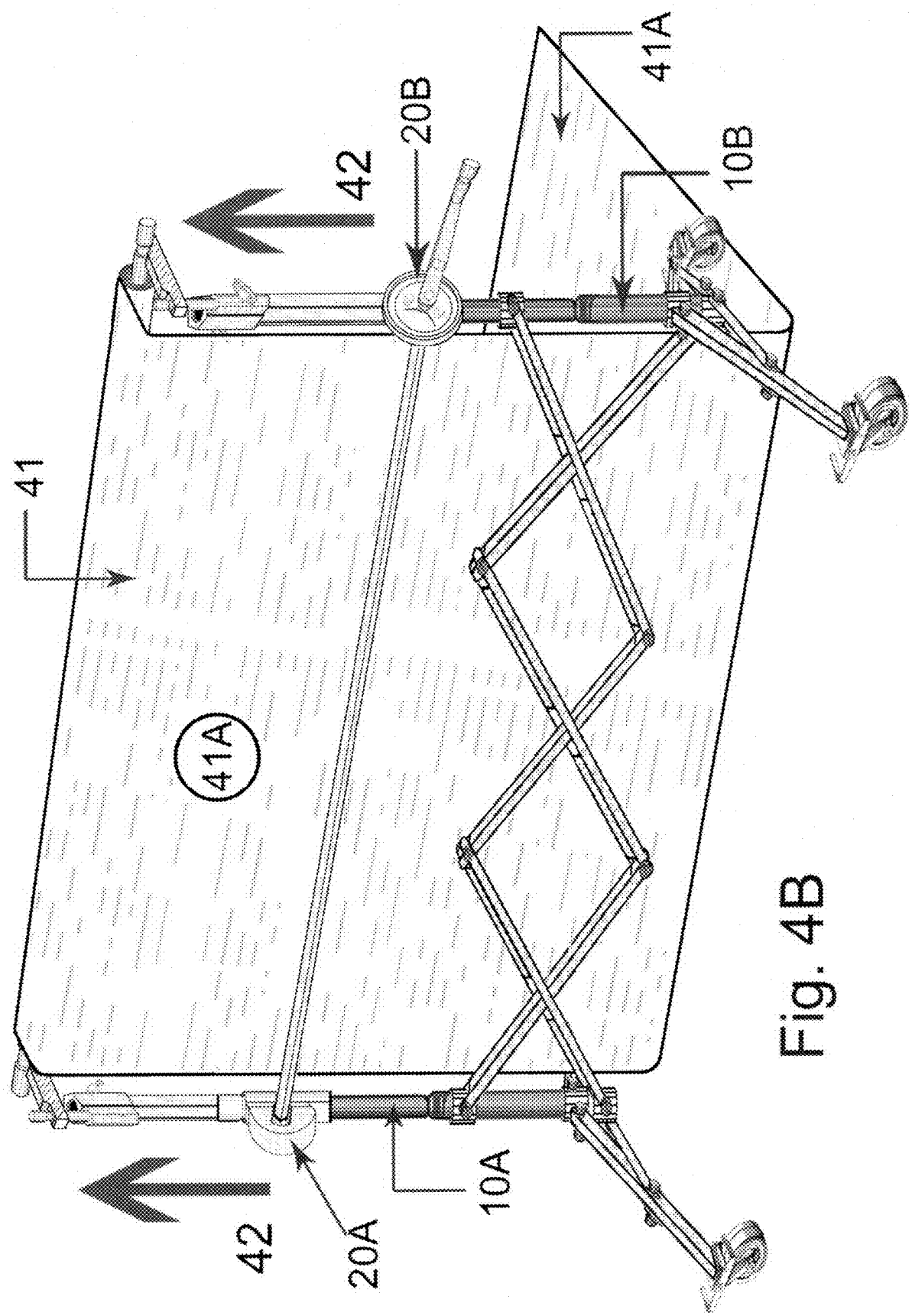

FIGS. 4A and 4B illustrate the use of a paper roll and its deployment.

Referring to FIG. 4A, the stand is essentially the same as that described in FIG. 2, except that holders 40A and 408 are connected to the top of legs 10A and 10B. A roll of paper or back drop 41 is secured to holders 40A and 40B allowing the roll of paper to be dispensed as indicated by arrows 42B In this manner, seamless paper rolls are placed and changed in a safe working height. No need to climb stepladders to operate or change rolls.

Once paper roll 41 has been installed, legs 10A and 10B are elongated as indicated by arrows 42 through the operation of winch 20A and 20B as described earlier. Paper 41A is dispensed during the upward motion to form the desired backdrop.

In some embodiments, a lower bar/roller has been installed at the base to keep the dispensed paper proximate to the ground level.

The stand is easily be operated by one person; both in the loading of the paper roll as well as the dispensing.

Figure 5:
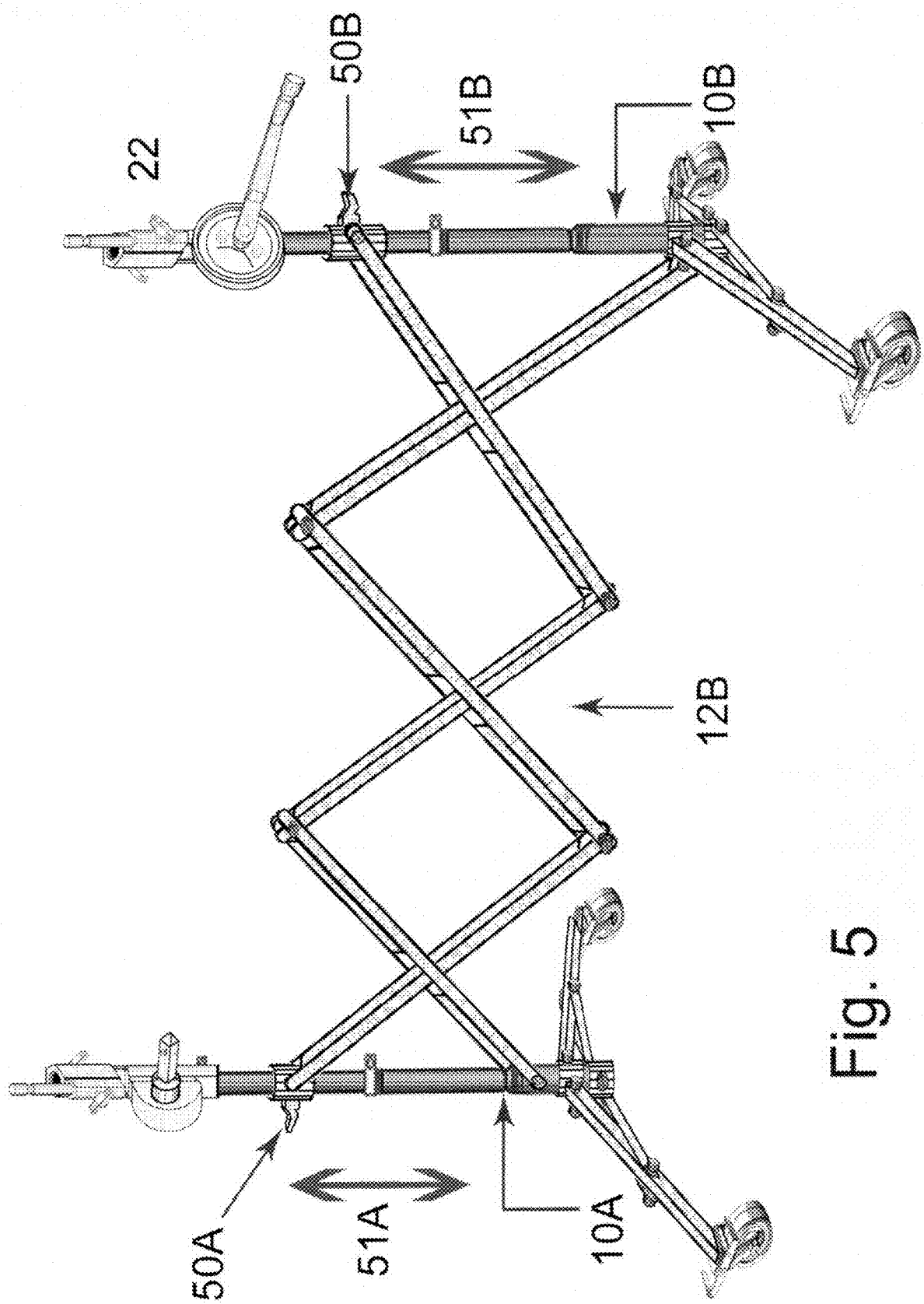
FIG. 5 illustrates an embodiment of the invention for the deployment of the scissor member.

FIG. 5 illustrates an embodiment of the invention for the deployment of the scissor member.

The stand illustrated is the one from FIG. 2B, scissor 12B is loosely secured to leg 10A and leg 10B via clamps 50A and SOB respectively. Clamps 50A and 50B are selectively loosen, allowing clamps 50A and 50B to be moved along legs 10A and 10B as indicated by arrows 51A and 51B. This motion causes scissor 12B to be elongated (for use) or withdrawn (for storage).

Once the desired movement has been obtained, clamps 50A and 50B are then tightened around legs 10A and 10B.

In this manner, the cross braces are unfolded from one side by sliding down the clamps 50A and 50B, requiring a single individual. No need for two people to pull them apart.

FIGS. 6A, 6B, 6C, and 6D illustrate the preferred secondary swivel mount.

Referring to FIG. 6A, swivel 62 is positioned so that opening 64 points upward. Opening 63 is positioned at the top of pole/leg 65. Note, in the preferred embodiment, opening 64 has a different diameter than opening 63; each allows the placement of a pin (not shown) so that different apparatus are mountable thereto.

The use of opening 64 allows the mount to address two different mounts for apparatus requiring differing pin diameters; to further enhance this embodiment, pin 60A has a diameter different that the pins used for opening 64 or 63. In this manner, the mount is able to address three different pin sizes. In one embodiment, pin 60 is absent, replaced by a receptacle (opening) having a different diameter than the other receptacles.

In operation, locking mechanism 61A is loosened and rotated as indicated by arrow 66 of FIG. 6B. This rotation removes opening 64 from use. Continued rotation as indicated in FIG. 6C continues to bring pin 60 into an upright position as shown in FIG. 6D which is then used for mounting purposes.

FIGS. 7A, 7B, 7C, 7D, and 7E illustrate different uses for the invention.

Figures 7A, 7B, 7C, 7D, 7E:
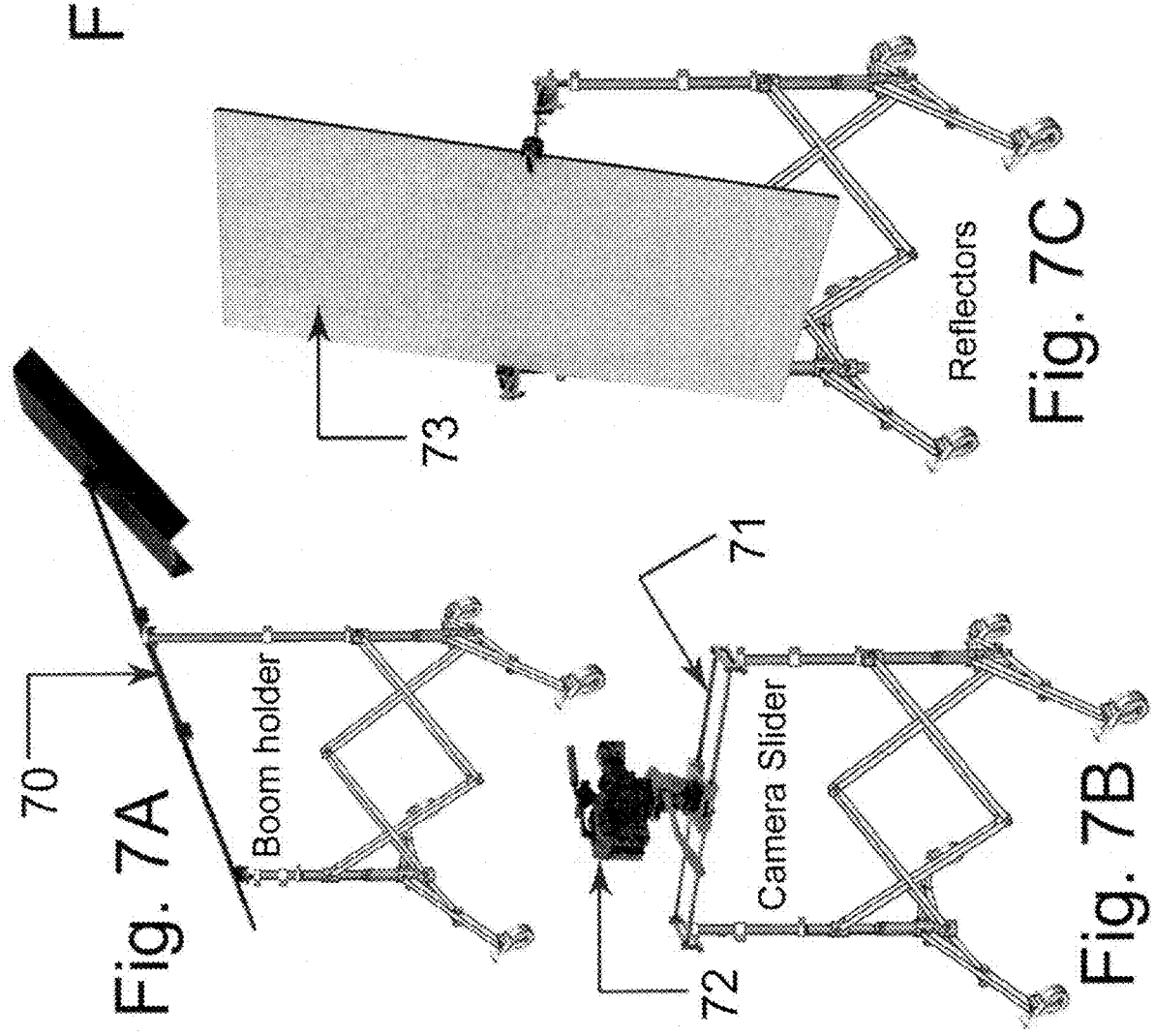

The stand of this invention has a variety of uses. As shown in FIG. 7A, it functions as a boom 70 holder allowing the center of gravity to stay closer to the ground (whereas traditionally counterweights have to be hung on boom end).

As illustrated in FIG. 7B, with the columns shortened, a camera slider 71 with camera 72 allows the assembly to be easily moved from location to location.

Positioning and movement of reflectors 73 is illustrated in FIG. 7C. Bounce boards or reflectors are securely be positioned an rolled around as needed.

The versatility of the stand is illustrated in FIG. 7D, where a clothes bar is used to keep clothing and costumes organized. In this manner, the stand serves as a multi-purpose studio accessory.

As shown in FIG. 7E, the stand is ideal for hanging cloth for backgrounds, used as a blocking wall or a light fill. The castors on the stand allows it to be moved in and out of position easily.

FIGS. 8A and 8B illustrate another embodiment of the winch.

In this embodiment, winch 82 is configured to engage with openings 81 during upward and downward movement along pole 80 as handle 83 is turned by the operator As handle 83 is turned, worm gear 84 engages sprocket 85 causing the teeth of sprocket 85 to engage openings 81 and move upward or downward along pole 80.

It is clear that the present invention provides for a highly improved stand which is versatile and readily moved.

What is claimed is:

1. A stand comprising:
    a) A first and a second leg, each leg having two spaced apart wheels and a vertical column, each leg having a receiver secured to a top thereof;
    b) A scissor member secured between the vertical column of the first leg and the vertical column of the second leg; and,
    Wherein the first and the second leg are selectively elongated.

2. The stand according to claim 1, wherein the receiver is configured to accept a paper roll.

3. The stand according to claim 2, further comprising a roller securable to the first leg and the second leg parallel to the scissor member.

4. The stand according to claim 1, wherein the receiver is removable from the first leg and the second leg.

5. The stand according to claim 4, wherein distal ends of the first leg and the second leg each include a mounting bracket accepting an implement thereto.

6. The stand according to claim 5, wherein the mounting bracket on the first leg and the second leg includes a first receptacle adapted to receive a pin having a first diameter.

7. The stand according to claim 6 further including two lockable swivels, each having a second receptacle having a second diameter and a protrusion having a third diameter, said lockable swivel being proximal to the top of the first leg and proximal to the top of the second leg, each of said lockable swivels adapted to selectively extend the protrusion above the end of an associated leg.

8. The stand according to claim 5, further including a boom secured to the top of the first leg and the top of the second leg.

9. The stand according to claim 4, wherein the spaced apart wheels of the first leg and the second leg are positionable proximate to their respective leg.

10. The stand according to claim 1, further including a winch combination having:
    a) a winch mechanism secured to the column of the first leg substantially at midpoint thereof and adapted to selectively elongate the first leg;
    b) a rotatable gear mechanism secured to the column of the second leg and adapted to selectively elongate the second leg; and,
    c) a rod connecting the winch mechanism and the rotatable gear assuring that the winch mechanism and the rotatable gear operate in concert.

11. A stand comprising:
    a) A first and a second leg, each leg having two spaced apart wheels and a vertical column, a receiver secured to a top of the first leg and a top of the second leg; and,
    b) A scissor member secured between the vertical column of the first leg and the column of the second leg, said scissor slidable connected to the first leg and the second leg.

12. The stand according to claim 11:
    a) Wherein the first and the second leg are selectively elongated; and,
    b) Wherein the receiver is configured to accept a paper roll.

13. The stand according to claim 11, wherein distal ends of the first leg and the second leg each include a mounting bracket accepting an implement thereto.

14. The stand according to claim 13, wherein the mounting bracket on the first leg and the second leg include a receptacle adapted to receive a pin having a first diameter.

15. The stand according to claim 14, wherein the first leg and the second leg each include a lockable swivel having a protrusion having a second diameter, each of said lockable swivels adapted to selectively extend the protrusion above the end of an associated leg.

16. The stand according to claim 15, further including a boom secured to the top of the first leg and the top of the second leg.

17. A stand comprising:
    a) A first and a second leg, being selectively elongated;
    b) A receiver secured to a top of the first leg and a top of the second leg;
    c) A scissor member secured between the column of the first leg and the column of the second leg;
    d) A winch mechanism secured to the column of the first leg substantially at midpoint thereof and adapted to selectively elongate the first leg;
    e) A rotatable gear mechanism secured to the column of the second leg and adapted to selectively elongate the second leg; and,
    f) A rod connecting the winch mechanism and the rotatable gear assuring that the winch mechanism and the rotatable gear operate in concert.

18. The stand according to claim 17, wherein the receiver is configured to accept a paper roll.

19. The stand according to claim 18, further comprising a roller securable to the first leg and the second leg parallel to the scissor member and wherein the roller is adapted to receive paper from the paper roll.

\* \* \* \* \*